United States Patent [19]
Jasken et al.

[11] Patent Number: 5,100,174
[45] Date of Patent: Mar. 31, 1992

[54] AUTO IGNITION PACKAGE FOR AN AIR BAG INFLATOR

[75] Inventors: Michael J. Jasken, Chandler; Jerome W. Emery, Tempe, both of Ariz.

[73] Assignee: TRW, Inc., Lyndhurst, Ohio

[21] Appl. No.: 629,425

[22] Filed: Dec. 18, 1990

[51] Int. Cl.⁵ .............................................. B60R 21/28
[52] U.S. Cl. ................................... 280/741; 102/530; 280/736
[58] Field of Search ................ 280/740, 741, 742, 743, 280/728, 730, 731, 736; 102/282, 530, 531

[56] References Cited

U.S. PATENT DOCUMENTS

| | | | |
|---|---|---|---|
| 2,974,592 | 3/1961 | Williams et al. | 102/531 |
| 4,178,017 | 12/1979 | Ishi et al. | 280/742 |
| 4,561,675 | 12/1985 | Adams et al. | 280/736 |
| 4,593,622 | 6/1986 | Fibranz | 102/282 |
| 4,858,951 | 8/1989 | Lenzen | 280/741 |
| 4,902,036 | 2/1990 | Zander et al. | 280/736 |

FOREIGN PATENT DOCUMENTS

| | | | |
|---|---|---|---|
| 0012626 | 6/1980 | European Pat. Off. | 280/736 |
| 3738436 | 11/1988 | Fed. Rep. of Germany | 280/736 |
| 4002088 | 8/1990 | Fed. Rep. of Germany | 280/736 |
| 0155858 | 6/1990 | Japan | 280/736 |

Primary Examiner—Kenneth R. Rice
Attorney, Agent, or Firm—Tarolli, Sundheim & Covell

[57] ABSTRACT

An inflator for inflating an air bag in a vehicle includes an inflator housing with an outer wall. A hermetically sealed canister is located in the housing. The canister has a first wall portion in thermal contact with the outer wall of the inflator housing. A body of gas generating material is disposed within the hermetically sealed canister. The gas generating material, when ignited, generates gas for inflating the air bag. An auto ignition packet including auto ignition material is secured within the hermetically sealed canister. The packet is in a recess in the canister in thermal contact with the first wall portion of the canister. The packet includes a flexible container, made of an air-permeable, fabric, sheet material, enclosing the auto ignition material.

23 Claims, 3 Drawing Sheets

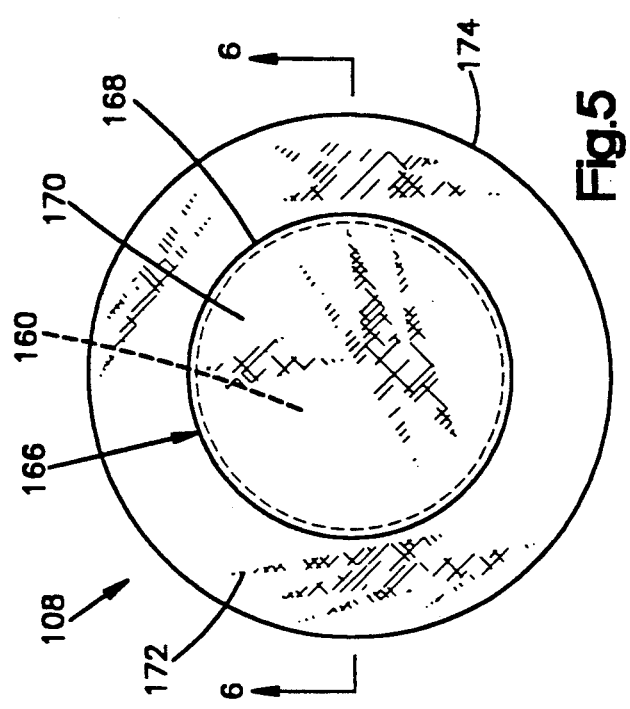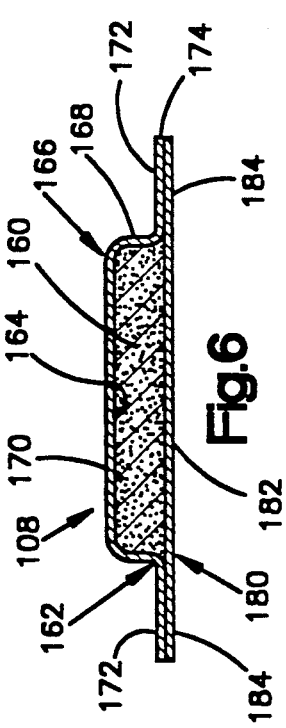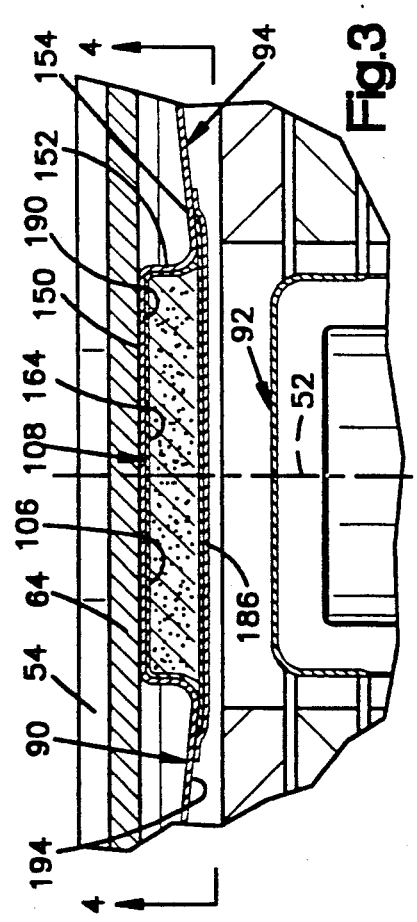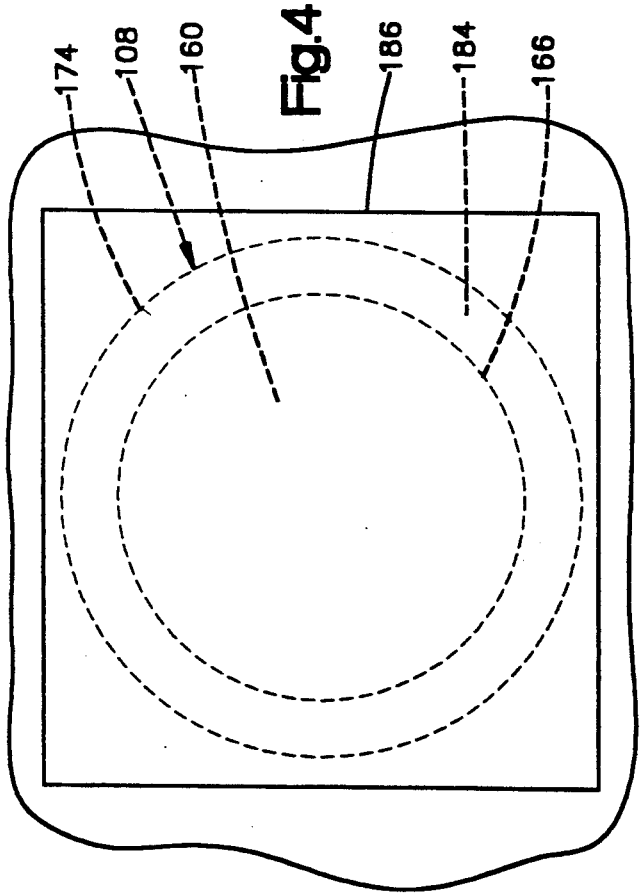

AUTO IGNITION PACKAGE FOR AN AIR BAG INFLATOR

BACKGROUND OF THE INVENTION

1. Technical Field

The present invention relates to an air bag inflator, and particularly to an inflator for inflating an air bag to protect the driver of a vehicle.

2. Description of the Prior Art

An inflator for a vehicle air bag commonly includes an igniter having igniter material which ignites when the igniter is actuated. Ignition of the igniter material ignites gas generating material. The gas generating material, when ignited, generates gas for inflating the air bag. The gas generating material typically ignites and burns at a temperature of about 650° F. or higher.

The inflator may on occasion be subjected to abnormally high temperatures. For example, if a vehicle is involved in a fire, the temperatures in the vehicle adjacent the inflator may reach or exceed 650° F. In such a situation, the gas generating material might be at a high enough temperature to ignite.

To avoid ignition of the gas generating material when the ambient vehicle temperature is excessively high, a quantity of auto ignition material is located within the inflator or the igniter. The auto ignition material is specifically designed to ignite at a lower temperature than the temperature at which the gas generating material ignites. The common auto ignition materials ignite at around 350° F. When the auto ignition material ignites, the gas generating material is ignited. Thus, the gas generating material is ignited when the ambient temperature is about 350° F. U.S. Pat. No. 4,561,675 discloses an air bag inflator including an auto ignition material. U.S. Pat. No. 4,858,951 discloses auto ignition material incorporated in an igniter used in the primary ignition train for an air bag inflator.

SUMMARY OF THE INVENTION

The present invention is an apparatus for inflating an air bag. The apparatus includes means for defining a hermetically sealed housing. The apparatus also includes gas generating material within the hermetically sealed housing which when ignited generates gas for inflating the air bag. An auto ignition packet is located within the hermetically sealed housing. The auto ignition packet includes a container and material in the container which auto ignites at about 350° F. The material of which the container is made is an inexpensive, flexible fabric which is an air-permeable non-metallic sheet material.

In a preferred embodiment, the apparatus is an inflator which includes a housing with an outer wall. A hermetically sealed canister is located in the housing. The canister has a wall portion in thermal contact with the outer wall of the inflator housing. The gas generating material is disposed within the hermetically sealed canister. The auto ignition packet is secured within the hermetically sealed canister in thermal contact with the wall portion of the canister. A piece of adhesive tape secures the auto ignition packet inside a recess in the canister wall portion.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged view of a portion of FIG. 2;

FIG. 4 is a view taken along line 4—4 of FIG. 3;

FIG. 5 is a top plan view of an auto ignition packet shown in FIG. 3; and

FIG. 6 is a sectional view taken along line 6—6 of FIG. 5.

DESCRIPTION OF A PREFERRED EMBODIMENT OF THE INVENTION

Figure 1:
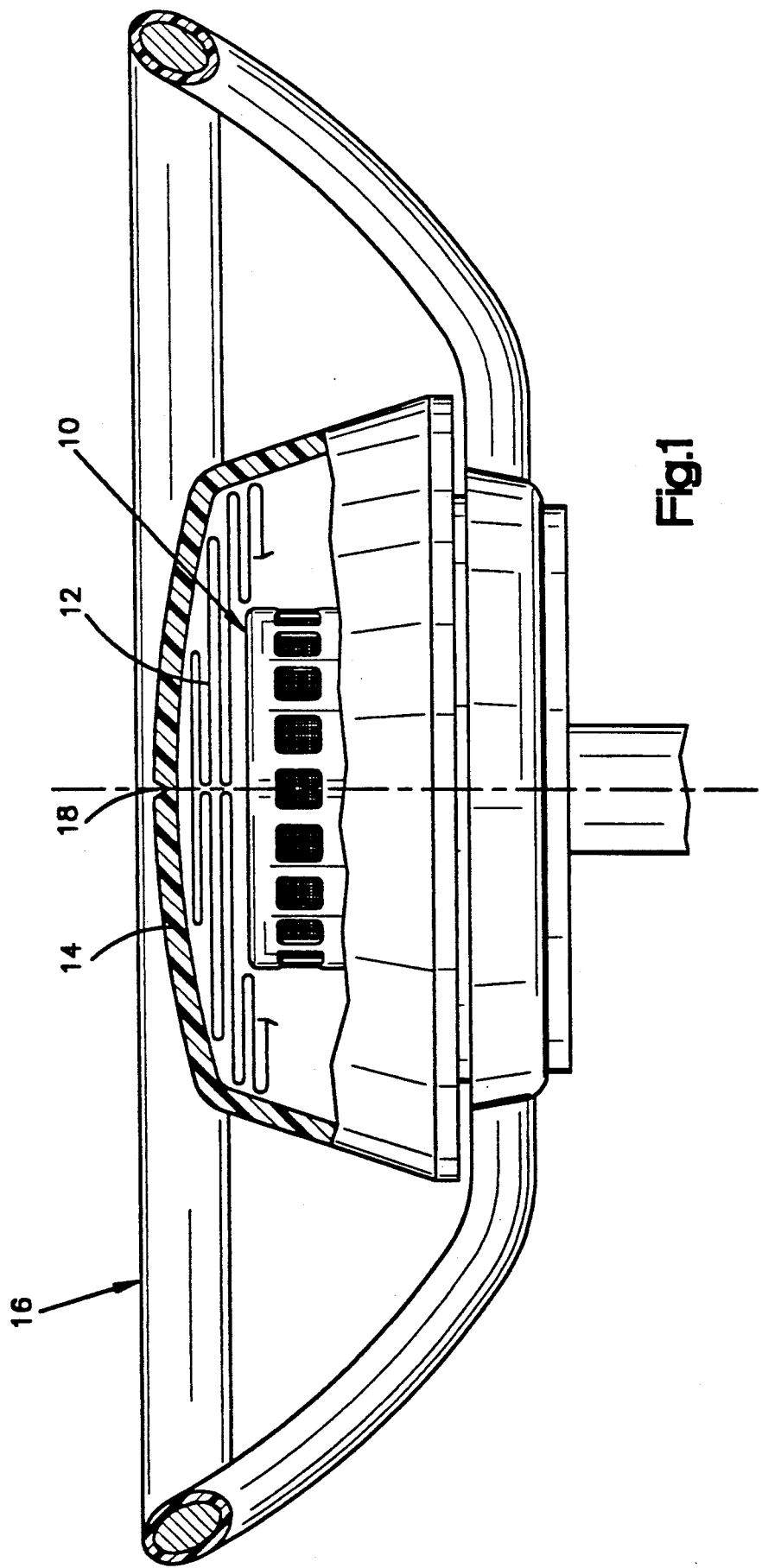
FIG. 1 is a transverse view, partially in section, of a vehicle steering wheel with an inflatable restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical diffuser cup side wall 50 extending around the central axis 52 of the inflator 10. The diffuser cup side wall 50 extends between a flat upper end wall 54 and a flat lower flange 56. An inner annular surface 55 on the flat upper end wall 54 of the diffuser cup 42 defines a central opening 57 in the upper end wall 54. The flat upper end wall 54 and the flat lower flange 56 are generally parallel to each other and perpendicular to the central axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the central axis 52. An annular array of openings 68 extends circumferentially around a lower portion of the combustion cup cylindrical side wall 60.

The upper end wall 64 of the combustion cup 44 is welded with a continuous weld to inner annular surface 55 on the upper end wall 54 of the diffuser cup 42 at a circumferential weld location 70, preferably by laser welding. The combustion cup flat lower flange 66 is welded with a continuous weld to the diffuser cup flat lower flange 56 at a circumferential weld location 72, also preferably by laser welding.

The combustion chamber cover 46 is a generally flat metal piece having a circular center portion 80 and a parallel but slightly offset annular outer flange 82. A circular opening 84 is located in the circular center portion 80 of the chamber cover 46. The annular outer flange 82 of the combustion chamber cover 46 is welded with a continuous weld to the combustion cup flat lower flange 66 at a circumferential weld location 86, again preferably by laser welding.

A hermetically sealed canister 90 is disposed in the combustion cup 44. Tho canister 90 is made of two pieces, namely a lower canister section 92 and a canister cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup cylindrical side wall 60. The cylindrical outer side wall 96 has a reduced thickness in the area adjacent the openings 68 in the combustion cup side wall 60. The canister lower section 92 also has a cylindrical inner side wall 98 spaced radially inwardly from the cylindrical outer side wall 96. The cylindrical inner side wall 98 has a reduced thickness in the area adjacent an igniter 142.

A flat ring-shaped lower wall 100 of the lower canister section 92 interconnects the cylindrical outer side wall 96 and the cylindrical inner side wall 98. A circular inner top wall 102 of the lower canister section 92 extends radially inwardly from and caps the inner side wall 98. The circular inner top wall 102 and the cylindrical inner side wall 98 define a downwardly opening central recess 104 in the hermetically sealed canister 90.

The canister cover 94 is generally circular in shape. A recess 106 is located in the center of the canister cover 94. An auto ignition packet 108 is located in the recess 106.

A plurality of gas generating annular disks 110 are stacked atop each other within the hermetically sealed canister 90. An annular cushion 112 is disposed between the uppermost gas generating disk 114 and the inside of the canister cover 94. The gas generating annular disks 110 are made of a known material which when ignited generates nitrogen gas. Although many types of gas generating material could be used, suitable gas generating materials are disclosed in U.S. Pat. No. 3,895,098.

In annular prefilter 120 is disposed in the hermetically sealed canister 90 The annular prefilter 120 is located radially outward of the gas generating annular disks 110 and radially inward of the cylindrical outer side wall 96 of the hermetically sealed canister 90. A small annular space exists between the annular prefilter 120 and the cylindrical outer side wall 96.

An annular slag screen indicated schematically at 122 is located in the diffuser cup 42, outside of the combustion cup 44. The annular slag screen 122 is radially outward of the annular array of openings 68 and lies against the combustion cup cylindrical side wall 60. However, the slag screen 122 could be spaced away from the openings 68 in the combustion cup cylindrical side wall 60.

An annular final filter assembly indicated schematically at 124 is located inside the diffuser cup 42 above the annular slag screen 122. The annular final filter assembly 124 is radially inward of the gas outlet openings 58 in the diffuser cup side wall 50 of the diffuser cup 42. The annular final filter assembly 124 is a plurality of layers of various materials. The layers extend around the diffuser cup side wall 50 and are located inside the side wall. The detailed structure of the final annular filter assembly 124 does not form a part of the present invention and therefore will not be described in detail.

An annular filter shield 126 projects radially inwardly from the diffuser cup side wall 50 and separates the annular final filter assembly 124 and the annular slag screen 122. An annular graphite seal 128 seals the gap between the upper edge of the annular final filter assembly 124 and the inside of the diffuser cup flat upper end wall 54. Another annular graphite seal 130 seals the gap between the lower edge of the annular final filter assembly 124 and the upper side of the annular filter shield 126.

The inflator 10 includes an initiator assembly 140. The initiator assembly 140 projects through the circular opening 84 in the combustion chamber cover 46 into the downwardly opening central recess 104 of the hermetically sealed canister 90. The initiator assembly 140 is welded with a continuous weld, preferably a laser weld, to the circular center portion 80 of the combustion chamber cover 46 at a circumferential weld location 144.

The initiator assembly 140 includes the igniter 142. The igniter 142 includes a pair of wire leads 146 which extend outwardly from the initiator assembly 140. The wire leads 146 are connectable to a collision sensor (not shown). The wire leads 146 are connected to a resistance wire embedded in an ignition material in the igniter 142. The igniter 142 may be of any suitable well known construction. A thin plastic film (not shown) is located on the outside of the upper portion of the igniter 142, to prevent metal-to-metal contact which could ground the igniter 142 and disable the inflator 10.

Upon the occurrence of a collision or other sudden vehicle deceleration, the collision sensor closes an electrical circuit. An electrical current then flows through the wire leads 146 to the igniter 142. The resistance wire sets off the ignition material which ignites a charge in the igniter 142. Ignition of the charge forms hot gas products which flow outwardly from the igniter 142 and rupture the circular inner top wall 102 and the cylindrical inner side wall 98 of the hermetically sealed canister 90. The hot gas from the igniter 142 ignites the gas generating annular disks 110. The gas generating annular disks 110 rapidly produce a large volume of another hot gas.

The pressure of the gas acts on the cylindrical outer side wall 96 of the hermetically sealed canister 90, forcing the cylindrical outer side wall 96 radially outwardly against the cylindrical side wall 60 of the combustion cup 44. This results in the thin cylindrical outer side wall 96 of the hermetically canister 90 being ruptured or blown out at the annular array of openings 68 in the cylindrical side wall 60. The reduced thickness of the cylindrical outer side wall 96 adjacent the openings 68 allows this portion of the side wall 96 to rupture in preference to other portions at a desired pressure.

The gas generated by burning of the gas generating annular disks 110 then flows radially outwardly through the annular prefilter 120. The annular prefilter 120 removes from the flowing gas some combustion products of the initiator assembly 140 and of the gas generating annular disks 110. The prefilter 120 cools the flowing gas. When the gas cools, molten products such as metal are plated onto the prefilter 120. The gas flows through the annular array of openings 68 and into the annular slag screen 122.

The annular slag screen 122 removes and traps particles from the flowing gas. The slag screen also cools the flowing gas. When the gas cools, molten combustion products such as metal are plated onto the annular slag screen 122. The annular filter shield 126 between the annular slag screen 122 and the annular final filter assembly 124 causes turbulent flow of gas to occur in and around the annular slag screen 122. The turbulent gas flow promotes the retention of relatively heavy particles in the annular slag screen 122 and in the lower portion of the diffuser cup 42.

The gas flows axially upwardly from the annular slag screen 122 to the annular final filter assembly 124. The gas then flows radially outwardly through the annular final filter assembly 124 which removes small particles from the gas. The annular final filter assembly 124 also further cools the gas so that molten products in the gas may deposit on parts of the annular final filter assembly 124. The annular array of gas outlet openings 58 directs the flow of gas into the air bag 12 (FIG. 1) to inflate the air bag 12.

In accordance with the present invention, the auto ignition packet 108 is located in the recess 106 in the center of the canister cover 94. The recess 106 is defined by a circular top wall 150 (FIG. 3) centered on the axis 52 of the inflator 10, and an annular recess side wall 152 extending downwardly from the outer edge of the circular top wall 150. Thus, the recess 106 is circular in shape. The annular recess side wall 152 curves radially outwardly into an outer annular portion 154 of the canister cover 94.

The auto ignition packet 108 (FIGS. 5 and 6) includes auto ignition material 160 enclosed within a container 162. The auto ignition material 160 is preferably a stabilized nitrocellulose composition such as IMR 4895, which auto ignites at about 350° F. This preferred material is produced by E. I. DuPont de Nemours & Co. Other materials capable of performing the auto ignition function would be acceptable for use in the present invention. The auto ignition material may also include an ignition enhancer such as $BKNO_3$.

The container 162 is preferably made of a flexible, air-permeable material such as a polypropylene fabric. A suitable polypropylene fabric is manufactured by Fiberweb North America, Inc. of Simpsonville, S.C., under the name APN-XXX where XXX denotes the density. Fabrics with a density in the range of 15 grams per square meter to 50 grams per square meter are suitable, with a preferred density being about 30 grams per square meter.

The container 162 is made of two separate pieces of material, namely a container cup 166 and a container cover 180. The body of auto ignition material 160 is disposed in a cavity 164 in the container cup 166. The cavity 164 is defined by an annular side wall 168 and a circular top wall 170 extending radially inwardly from the annular side wall 168. An annular flange portion 172 of the container cup 166 extends from the annular side wall 168 radially outwardly to the outer edge 174 of the container 162.

The container cover 180 is a flat piece of material which is joined to the container cup 166. The container cover 180 has a central portion 182 located opposite the circular top wall 170 of the container cup 166. The container cover 180 has an annular outer flange portion 184 in abutting engagement with the annular flange portion 172 of the container cup 166.

In manufacture of the auto ignition packet 108, two pieces of material in sheet form are provided. The container cup 166 is initially formed in one piece to define the cavity 164. The container cup 166 is then oriented so that the cavity 164 opens upwardly. The auto ignition material 160 in powder form is deposited in the cavity 164. The other piece of sheet material forming the container cover 180 is placed on top of the container cup 166.

The flange portion 184 of the container cover 180 is then secured to the annular flange portion 172 of the container cup 166, preferably by ultrasonic welding. Alternatively, the container cover 180 can be secured to the container cup 166 by any other method which does not heat the auto ignition material 160 to its ignition temperature.

In assembly of the auto ignition packet 108 in the inflator 10, the canister cover 94, separate from any other part of the inflator 10, is first positioned so that the recess 106 opens upwardly. The auto ignition packet 108 is placed in the recess 106. The radially outer flange portions 172, 184 of the auto ignition packet 108 may extend radially outwardly of the annular recess side wall 152, as indicated in FIG. 3.

A piece of tape 186 (FIGS. 3 and 4) is then placed across the recess 106 with its edges on the outer annular portion 154 of the canister cover 94. The tape 186 thus covers the recess 106 and secures the auto ignition packet 108 in the recess. The tape 186 is preferably an ultrahigh temperature aluminum foil tape, product No. 433 of 3M Company, having a silicone base adhesive thereon. The tape 186 retains its adhesive quality at temperatures up to and above the ignition point of the auto ignition material 160, i.e., above about 350° F. The auto ignition packet 108 is thereby held in the recess 106 at the temperature at which the auto ignition material 160 ignites.

When the auto ignition packet 108 is disposed in the recess 106, the circular top wall 170 of the auto ignition packet 108 engages an inner wall surface 190 on the circular canister top wall 150 of the canister cover 94. The circular canister top wall 150 is in abutting engagement with the flat upper end wall 64 of the combustion cup 44. The flat upper end wall 64 of the combustion cup 44 is exposed to the outside of the inflator 10 through the central opening 57 in the flat upper end wall 54 of the diffuser cup 42.

In the event of a fire around the inflator, heat from the fire travels through the exposed flat upper end wall 64, through the thin circular canister top wall 150 on the canister cover 94 and the circular top wall 170 of the container cup 166, and into the auto ignition material 160. When the temperature of the auto ignitions material rises to its ignition point of about 350° F., the auto ignition material 160 ignites and thereby ignites the gas annular disks 110. The polypropylene fabric of container 162 is very thin, to promote good heat transfer between the circular canister top wall 150 and the auto ignition material 160.

In order to avoid degradation of the auto ignition material 160 over time, the auto ignition material 160 is in the hermetically sealed canister 90. Therefore, the container 162 for the auto ignition material 160 need not be hermetically sealed. Thus, the inexpensive, air-permeable material, discussed above, can be used for the container 162.

Figure 2:
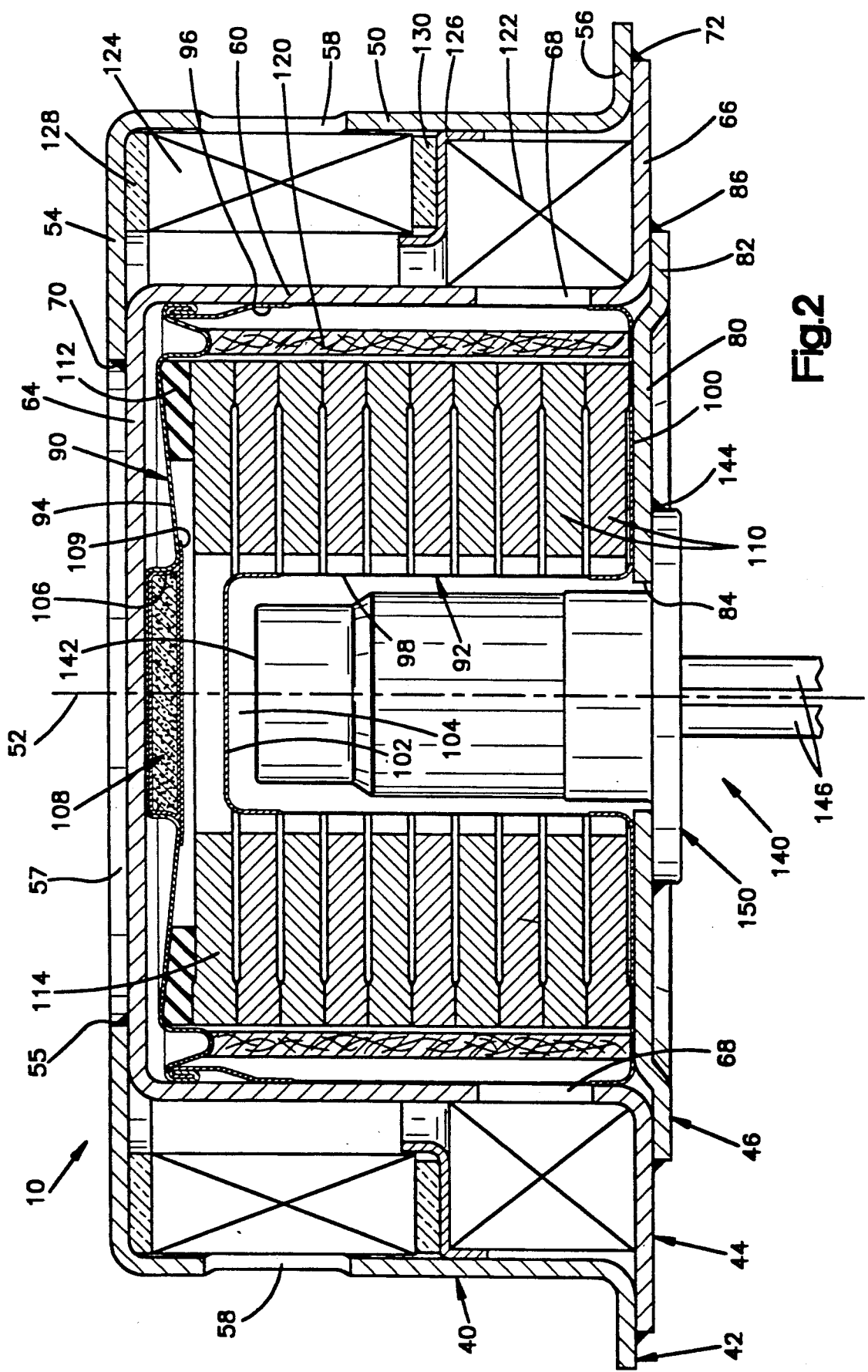
FIG. 2 is a transverse view, partially in section, of the inflator of FIG. 1.

Locating the auto ignition packet 108 on the inside of the canister cover 94 simplifies assembly of the inflator 10 (FIG. 2). In assembly of the inflator 10, the auto ignition packet 108 is secured inside the canister cover 94 as described above. The gas generating annular disks 110 are placed within the separate lower canister section 92, along with the annular prefilter 120 and the annular cushion 112. The canister cover 94, with the auto ignition packet 108 secured in place, is then sealed hermetically to the lower canister section 92. Having the auto ignition packet 108 in the recess 106 locates the packet 108 above the inner wall surface 194 of the outer annular portion 154 of the canister cover 94. Thus, during assembly of the inflator 10, the auto ignition material 160 is kept safely out of the way of other part of the inflator 10 such as the gas generating annular disks 110.

From the above description of the invention, those skilled in the art will perceive improvements, changes and modifications Such improvements, changes and modifications within the skill of the art are intended to be covered by the appended claims

We claim:

1. Apparatus for inflating an air bag comprising: means for defining a hermetically sealed housing; gas generating material within said hermetically sealed housing which when ignited generates gas for inflating the air bag; and an auto ignition packet within said hermetically sealed housing, said auto ignition packet comprising a container made of an air-permeable sheet material and auto ignition material which is enclosed within said container, said auto ignition material having an ignition temperature below the ignition temperature of said gas generating material.

2. Apparatus as defined in claim 1 further comprising an inflator housing, said hermetically sealed housing being a separate canister disposed within said inflator housing.

3. Apparatus as defined in claim 2 including means for defining a recess in said canister, said auto ignition material being located in said recess in said canister.

4. Apparatus as defined in claim 3 wherein said canister comprises a canister lower section in which said gas generating material is disposed and a canister cover hermetically sealed to said canister lower section, said means for defining said recess comprising means for defining said recess in said canister cover, said auto ignition material being located in said recess in said canister cover.

5. Apparatus as defined in claim 3 wherein said means for defining said recess comprises an outer wall portion of said canister in thermal contact with an exposed outer wall portion of said inflator housing.

6. Apparatus as defined in claim 3 further comprising means for securing said auto ignition packet in said recess in said canister cover.

7. Apparatus as defined in claim 6 wherein said securing means comprises a piece of adhesive tape for holding said auto ignition packet in said recess, said adhesive tape adhering to said canister cover at temperatures up to the ignition temperature of said auto ignition material.

8. Apparatus as defined in claim 1 wherein said material is an air permeable polypropylene fabric.

9. Apparatus as defined in claim 1 wherein said container includes a cup portion having means defining a cavity in said cup portion for receiving said auto ignition material and a cover portion fixed to said cup portion to close said cavity.

10. Apparatus as defined in claim 1 wherein said air-permeable sheet material is a polypropylene fabric.

11. Apparatus as defined in claim 1 wherein said container is entirely made of said sheet material.

12. Apparatus for inflating an air bag, comprising: means for defining a hermetically sealed housing, gas generating material within said hermetically sealed housing which when ignited generates gas for inflating the air bag; means for defining a recess within said hermetically sealed housing; an auto ignition packet in said recess, said auto ignition packet comprising a container made of a flexible non-metallic sheet material and auto ignition material in said container, said auto ignition material having an ignition temperature below the ignition temperature of said gas generating material; and means for holding said auto ignition packet in said recess.

13. Apparatus as defined in claim 12 wherein said flexible sheet material is a fabric and further comprising an inflator housing and wherein said means for defining a hermetically sealed housing comprises a separate canister disposed within said inflator housing, said gas generating material being disposed in said canister.

14. Apparatus as defined in claim 13 wherein said means for holding said packet in said recess comprises a piece of adhesive tape securing said auto ignition packet to an inner surface of said canister, said adhesive tape adhering to said inner surface at temperatures up to the ignition temperature of said auto ignition material.

15. Apparatus as defined in clam 13 wherein said canister comprises a canister lower section in which said gas generating material is disposed and a canister cover hermetically sealed to said canister lower section, said means for defining a recess comprising means for defining said recess in said canister cover, said auto ignition material being located in said recess in said canister cover.

16. Apparatus as defined in claim 15 wherein said means defining said recess comprises an outer wall portion of said canister in thermal contact with an exposed outer wall portion of said inflator housing.

17. Apparatus as defined in claim 12 wherein said flexible non-metallic sheet material is air-permeable.

18. Apparatus as defined in claim 17 wherein said container includes a cup portion having means defining a cavity in said cup portion for receiving said auto ignition material and a cover portion adhered to said cup portion to close said body of auto ignition material in the cavity.

19. Apparatus as defined in claim 12 wherein said sheet material has a density within the range of 15 grams per square meter to 50 grams per square meter.

20. In a method of making an air bag inflator having ignitable gas generating material, the steps comprising: forming a cavity in a first piece of flexible non-metallic sheet material;

depositing auto ignition material in the cavity, said auto ignition material having an ignition temperature below the ignition temperature of the gas generating material;

attaching a second piece of flexible non-metallic sheet material to the first piece of flexible sheet material to close the cavity, thereby forming an auto ignition packet; and placing the auto ignition packet in a first member of a housing of the air bag inflator.

21. A method as defined by claim 20 wherein the step of placing the auto ignition packet in the first member comprises placing the auto ignition packet in a recess in the first member and further comprising the step of securing the auto ignition packet in the recess.

22. A method as defined by claim 21 wherein said step of securing-the auto ignition packet in the recess comprises placing a piece of tape over said packet in said recess.

23. A method as defined in claim 20 wherein said flexible non-metallic sheet material is an air-permeable polypropylene fabric.

* * * * *

UNITED STATES PATENT AND TRADEMARK OFFICE
CERTIFICATE OF CORRECTION

PATENT NO. : 5,100,174

DATED : March 31, 1992

INVENTOR(S) : Michael J. Jasken and Jerome W. Emery

It is certified that error appears in the above-identified patent and that said Letters Patent is hereby corrected as shown below:

Column 8, Line 24, Claim 12, delete "in" and insert --which is enclosed within--.

Column 8, Line 31, Claim 13, before "sheet" insert --non-metallic--.

Signed and Sealed this

Twenty-fifth Day of May, 1993

Attest:

MICHAEL K. KIRK

Attesting Officer

Acting Commissioner of Patents and Trademarks